US011927189B2

(12) United States Patent
Ueda et al.

(10) Patent No.: US 11,927,189 B2
(45) Date of Patent: Mar. 12, 2024

(54) HERMETIC COMPRESSOR

(71) Applicant: FUJITSU GENERAL LIMITED, Kanagawa (JP)

(72) Inventors: Kenshi Ueda, Kanagawa (JP); Naoya Morozumi, Kanagawa (JP); Naoto Tada, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days.

(21) Appl. No.: 18/025,131

(22) PCT Filed: Sep. 29, 2021

(86) PCT No.: PCT/JP2021/036010
§ 371 (c)(1),
(2) Date: Mar. 7, 2023

(87) PCT Pub. No.: WO2022/071450
PCT Pub. Date: Apr. 7, 2022

(65) Prior Publication Data
US 2024/0052832 A1    Feb. 15, 2024

(30) Foreign Application Priority Data
Sep. 30, 2020  (JP) ................. 2020-165857

(51) Int. Cl.
*F04C 15/00*    (2006.01)
*B01D 46/24*    (2006.01)
(Continued)

(52) U.S. Cl.
CPC .............. *F04C 2/321* (2013.01); *B01D 46/24* (2013.01); *F04C 15/00* (2013.01); *F04C 29/12* (2013.01); *F04C 2240/804* (2013.01)

(58) Field of Classification Search
CPC ........ F04C 2/321; F04C 15/00; F04C 18/356; F04C 29/12; F04C 2240/804; B01D 46/24
(Continued)

(56) References Cited

U.S. PATENT DOCUMENTS

| 5,051,076 A | 9/1991 | Okoma et al. |
| 5,545,021 A * | 8/1996 | Fukuoka ................. F04C 29/02 |
| | | 418/99 |
| 6,213,732 B1 * | 4/2001 | Fujio ..................... F04C 29/068 |
| | | 181/403 |

FOREIGN PATENT DOCUMENTS

| CN | 202117925 U | 1/2012 |
| CN | 112145428 A * | 12/2020 |

(Continued)

OTHER PUBLICATIONS

CN-112145428-A, translation, 2023 (Year: 2023).*
JP-2020109283-A, translation, 2023 (Year: 2023).*

*Primary Examiner* — J. Todd Newton
(74) *Attorney, Agent, or Firm* — Paratus Law Group, PLLC

(57)    ABSTRACT

In a compression unit, an upper compression unit suction tube is connected to an upper suction hole of an upper cylinder, and a lower compression unit suction tube is connected to a lower suction hole of a lower cylinder. In an accumulator shell of an accumulator vessel, an accumulator suction tube, an upper gas-liquid separation tube, and a lower gas-liquid separation tube penetrate a side wall of the accumulator shell, and are fixed by welding to a first through hole, a second through hole, and a third through hole of the accumulator shell, respectively. The upper gas-liquid separation tube is connected to the upper compression unit suction tube via an upper connecting tube outside the accumulator shell. The lower gas-liquid separation tube is (Continued)

connected to the lower compression unit suction tube via a lower connecting tube outside the accumulator shell.

3 Claims, 6 Drawing Sheets

(51) Int. Cl.
*F04C 2/32* (2006.01)
*F04C 29/12* (2006.01)

(58) Field of Classification Search
USPC .......................................................... 418/229
See application file for complete search history.

(56) References Cited

FOREIGN PATENT DOCUMENTS

| | | | |
|---|---|---|---|
| JP | H02-123289 A | 5/1990 | |
| JP | H03-202682 A | 9/1991 | |
| JP | 2011-007077 A | 1/2011 | |
| JP | 2020-109283 A | 7/2020 | |
| JP | 6724513 B2 | 7/2020 | |
| JP | 2020109283 A | * | 7/2020 |

\* cited by examiner

HERMETIC COMPRESSOR

CROSS REFERENCE TO PRIOR APPLICATION

This application is a National Stage Patent Application of PCT International Patent Application No. PCT/JP2021/036010 (filed on Sep. 29, 2021) under 35 U.S.C. § 371, which claims priority to Japanese Patent Application No. 2020-165857 (filed on Sep. 30, 2020), which are all hereby incorporated by reference in their entirety.

FIELD

The present invention relates to a hermetic compressor.

BACKGROUND

As the hermetic compressor, a compressor is known that accommodates a compression unit and a motor that drives the compression unit inside a vertically cylindrical compressor body vessel, and is provided with an accumulator vessel for separating a refrigerant into a gas refrigerant and a liquid refrigerant (hereinafter referred to as separation of gas-liquid of refrigerant) and sucking only the gas refrigerant into the compression unit, below the compressor body vessel.

CITATION LIST

Patent Literature

Patent Literature 1: Japanese Laid-open Patent Publication No. 2020-109283
Patent Literature 2: Japanese Laid-open Patent Publication No. H03-202682

SUMMARY

Technical Problem

In the compressor of Patent Literature 1, the compression unit is a rotary compressor, the accumulator vessel, which separates gas-liquid of the refrigerant that is sucked into the compression unit, includes a vessel independent of the compressor body vessel, and is disposed below the compressor body vessel, and the compressor body vessel and the accumulator vessel are connected using a bracket. The configuration of Patent Literature 1 has a problem of increasing vessel costs because the compressor body vessel and the accumulator vessel are configured as independent vessels, and a problem of increasing costs because the bracket, to connect the compressor body vessel to the accumulator vessel, is used.

In the compressor of Patent Literature 2, the compression unit is a scroll-type compressor, and the accumulator vessel is directly joined to a lower portion of the compressor body vessel that accommodates the compression unit and the motor that drives the compression unit. In more detail, in the first embodiment of Patent Literature 2, the compressor body vessel includes a vertically cylindrical main shell, a cup-shaped top shell that blocks the upper end of the main shell, and a cup-shaped bottom shell that blocks the lower end of the main shell. The accumulator vessel defines the space, sealed by the bottom shell and the accumulator shell, as an accumulator vessel by fixing an opening side of the cup-shaped accumulator shell to the lower side of the bottom shell by welding (hereinafter referred to as fixed by welding). That is, the bottom shell serves as part of the compressor body vessel and part of the accumulator vessel. The bottom shell is provided with a compression unit suction tube that penetrates the bottom shell, and the refrigerant inside the accumulator vessel is sucked into the compression unit through a gas-liquid separation tube, which is connected to the compression unit suction tube.

In the structure of Patent Literature 2, the compression unit suction tube, penetrating the bottom shell, is fixed by welding to the bottom shell inside the accumulator vessel. In general, in a hermetic compressor for an air conditioner, to inspect whether a shell that constitutes a closed vessel has defective welding, high-pressure gas is sealed inside to check whether leakage to the outside occurs in a water tank before shipping.

If there is a defect in the welded portion where the bottom shell and the compression unit suction tube of the first embodiment of Patent Literature 2 are fixed by welding, this may cause a leakage of the refrigerant gas from inside the compressor body vessel to inside the accumulator vessel. There is a problem that this welding defect is undetectable by the above method, and that when the compressor is operating, the high-pressure refrigerant inside the compressor body vessel leaks into the low-pressure accumulator vessel, leading to lower efficiency and lower reliability.

The compressor of Patent Literature 2 has a problem that since the refrigerant inside the accumulator vessel is directly sucked into the compression unit through the gas-liquid separation tube connected to the compression unit suction tube, it is not possible to secure the length of the suction channel way properly and to obtain a sufficient supercharging effect. Here, the supercharging effect is a phenomenon in which, with the change in the volume of a hollow part of a cylinder in the compression unit (cylinder chamber), the pressure inside the gas-liquid separation tube of the accumulator vessel fluctuates periodically, the natural frequency of the gas-liquid separation tube and the frequency of the compression unit match and resonate, the pressure change inside the gas-liquid separation tube increases significantly, and an excessive refrigerant is pushed into the cylinder chamber. This is a technology to increase the pressure fluctuation inside the suction channel way to increase the volumetric efficiency of the compressor by adjusting the length of the suction channel way to cause resonance inside the suction channel way when the compressor is operated at a predetermined number of revolutions.

The disclosed technology has been made in view of the above description, and an object is to provide a compressor that, in a structure in which the accumulator vessel is disposed below the compressor body vessel, suppresses the manufacturing cost of the compressor and prevents refrigerant leakage from the compressor body vessel into the accumulator vessel, achieves an improvement in volumetric efficiency due to the supercharging effect, and has high reliability and performance.

Solution to Problem

According to an aspect of an embodiments in the present application, a hermetic compressor includes: a vertically cylindrical compressor body vessel in which a compression unit that sucks a refrigerant and discharges the compressed refrigerant into the compressor body vessel, and a motor that drives the compression unit, are accommodated; and an accumulator vessel that separates gas-liquid of the refrigerant sucked from a refrigeration cycle and supplies a gas refrigerant to the compression unit, and is provided below the compressor body vessel, wherein the compression unit includes an upper cylinder and a lower cylinder, an upper compression unit suction tube is connected to an upper suction hole of the upper cylinder, a lower compression unit suction tube is connected to a lower suction hole of the lower cylinder, the accumulator vessel includes a cup-shaped accumulator shell, an opening side of the accumulator shell is fixed by welding to the compressor body vessel, in the accumulator shell, an accumulator suction tube that sucks the refrigerant from the refrigeration cycle into the accumulator vessel, and an upper gas-liquid separation tube and a lower gas-liquid separation tube that send the gas refrigerant from inside the accumulator vessel penetrate a side wall of the accumulator shell, and are fixed by welding to a first through hole, a second through hole, and a third through hole of the accumulator shell respectively, the upper gas-liquid separation tube is connected to the upper compression unit suction tube via an upper connecting tube outside the accumulator shell, and the lower gas-liquid separation tube is connected to the lower compression unit suction tube via a lower connecting tube outside the accumulator shell.

Advantageous Effects of Invention

According to one aspect of the hermetic compressor disclosed in the present application, in a structure in which an accumulator vessel is disposed below a compressor body vessel, welded portions of an upper gas-liquid separation tube, an upper connecting tube, and an upper compression unit suction tube, and welded portions of a lower gas-liquid separation tube, a lower connecting tube, and a lower compression unit suction tube are disposed outside the accumulator vessel, thereby making it possible to provide a compressor that suppresses the manufacturing cost of the compressor, can easily detect welding defects, achieves an improvement in volumetric efficiency due to a supercharging effect, and has high reliability and performance.

DESCRIPTION OF EMBODIMENTS

An embodiment of a hermetic compressor, disclosed in the present application, will be described in detail below with reference to the drawings. Note that the hermetic compressor, disclosed in this application, is not limited by the following embodiment.

EMBODIMENT (Configuration of Rotary Compressor)

Figure 1:
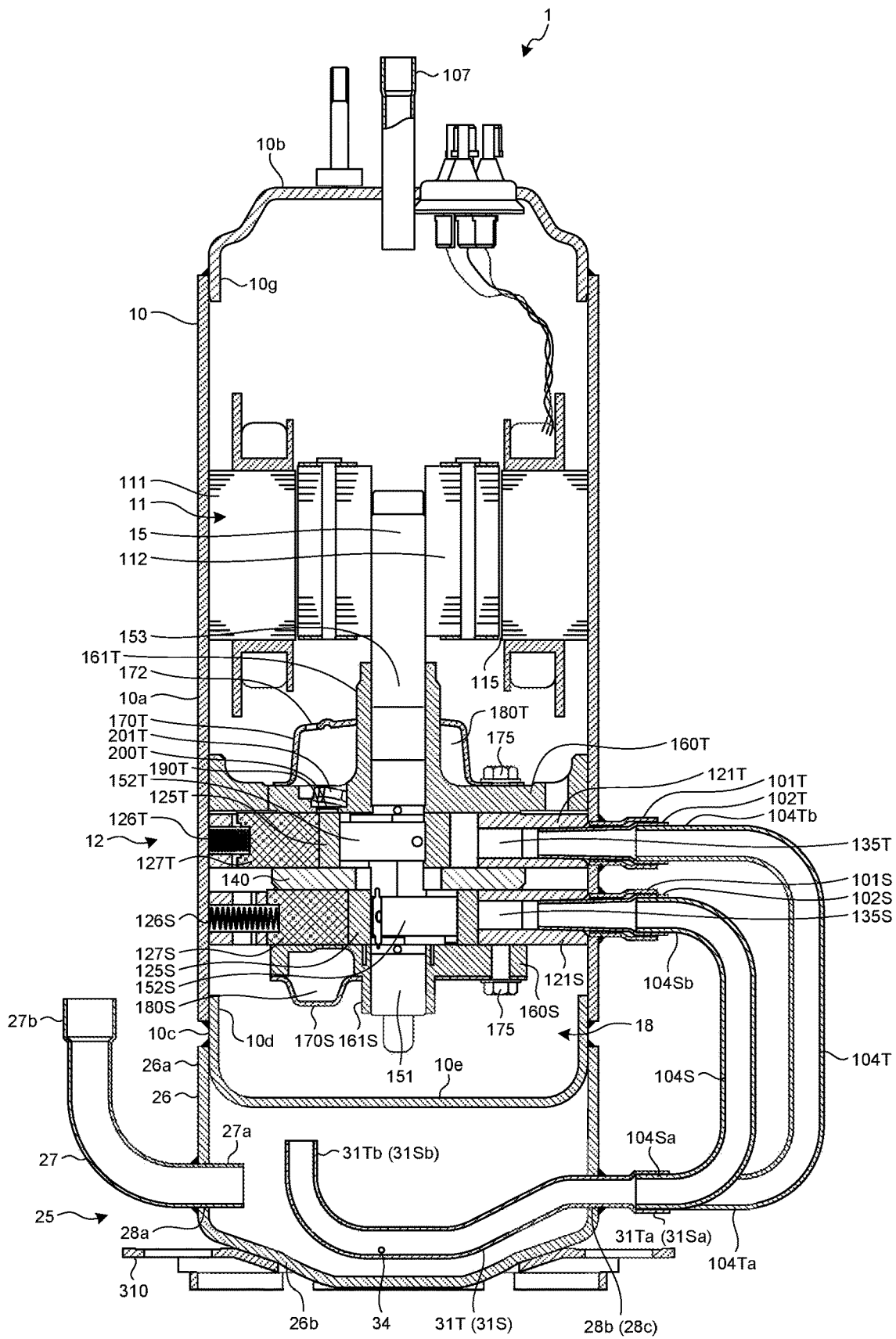
FIG. 1 is a longitudinal sectional view illustrating a rotary compressor of an embodiment.
Figure 2:
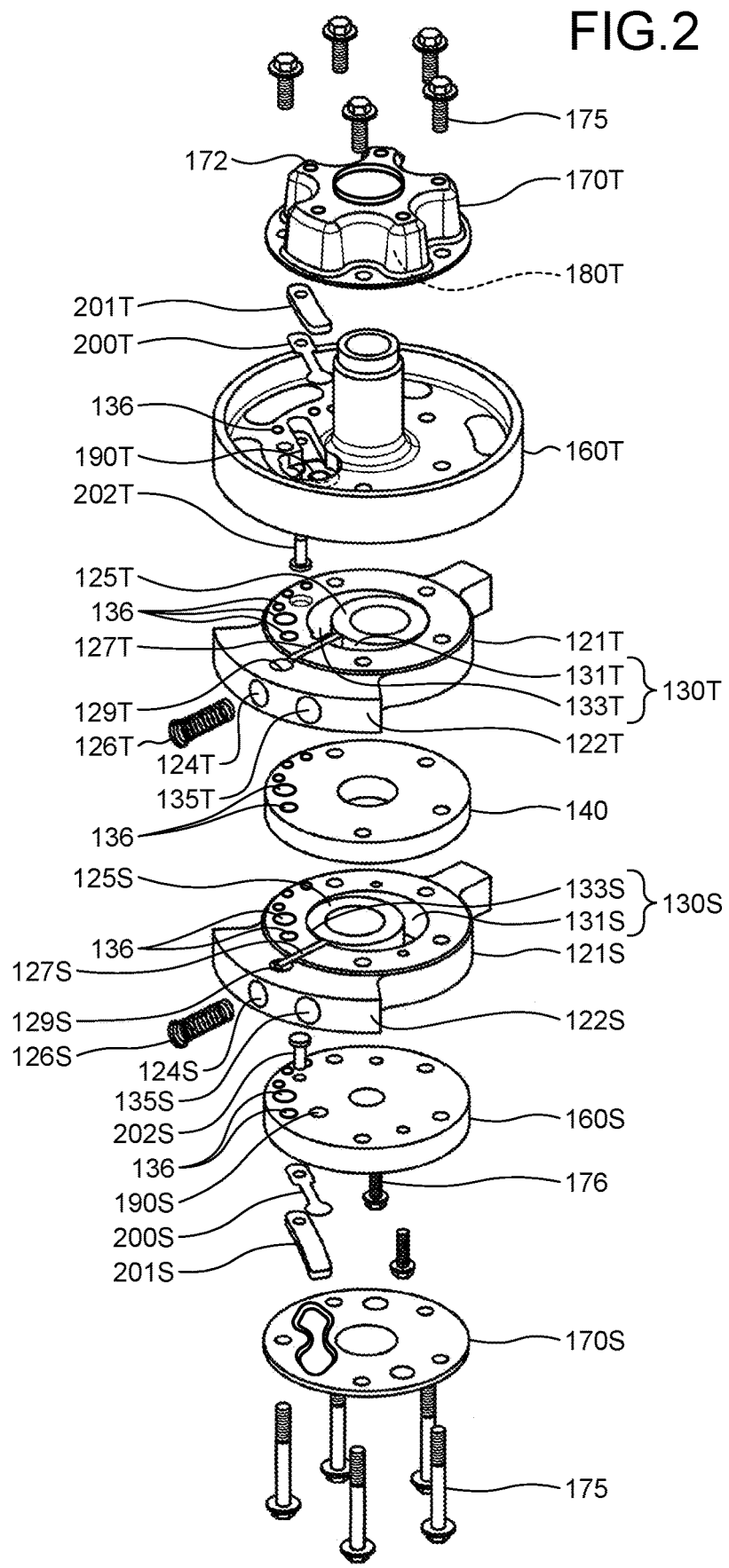
FIG. 2 is an exploded perspective view illustrating a compression unit of the rotary compressor of the embodiment.
Figure 3:
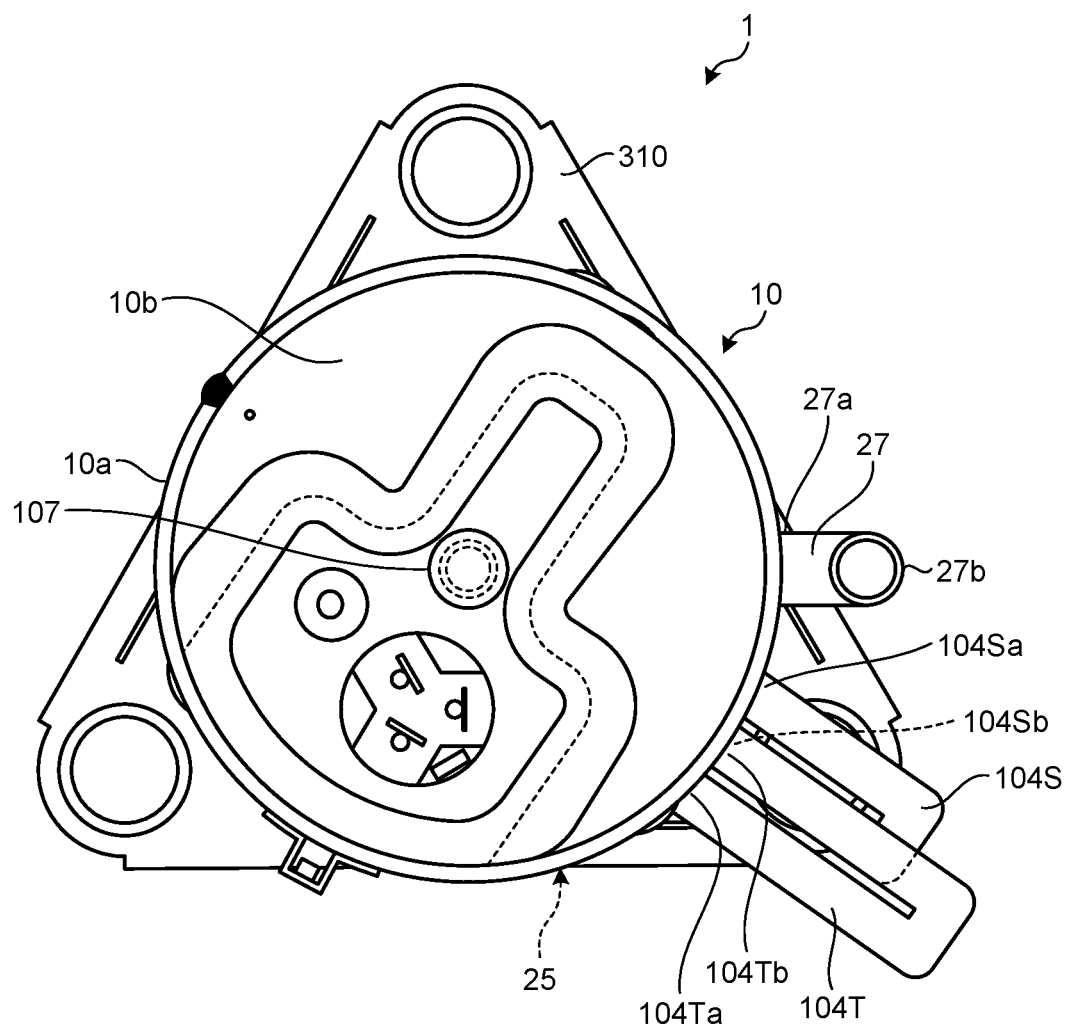
FIG. 3 is a plan view illustrating the rotary compressor of the embodiment.
Figure 4:
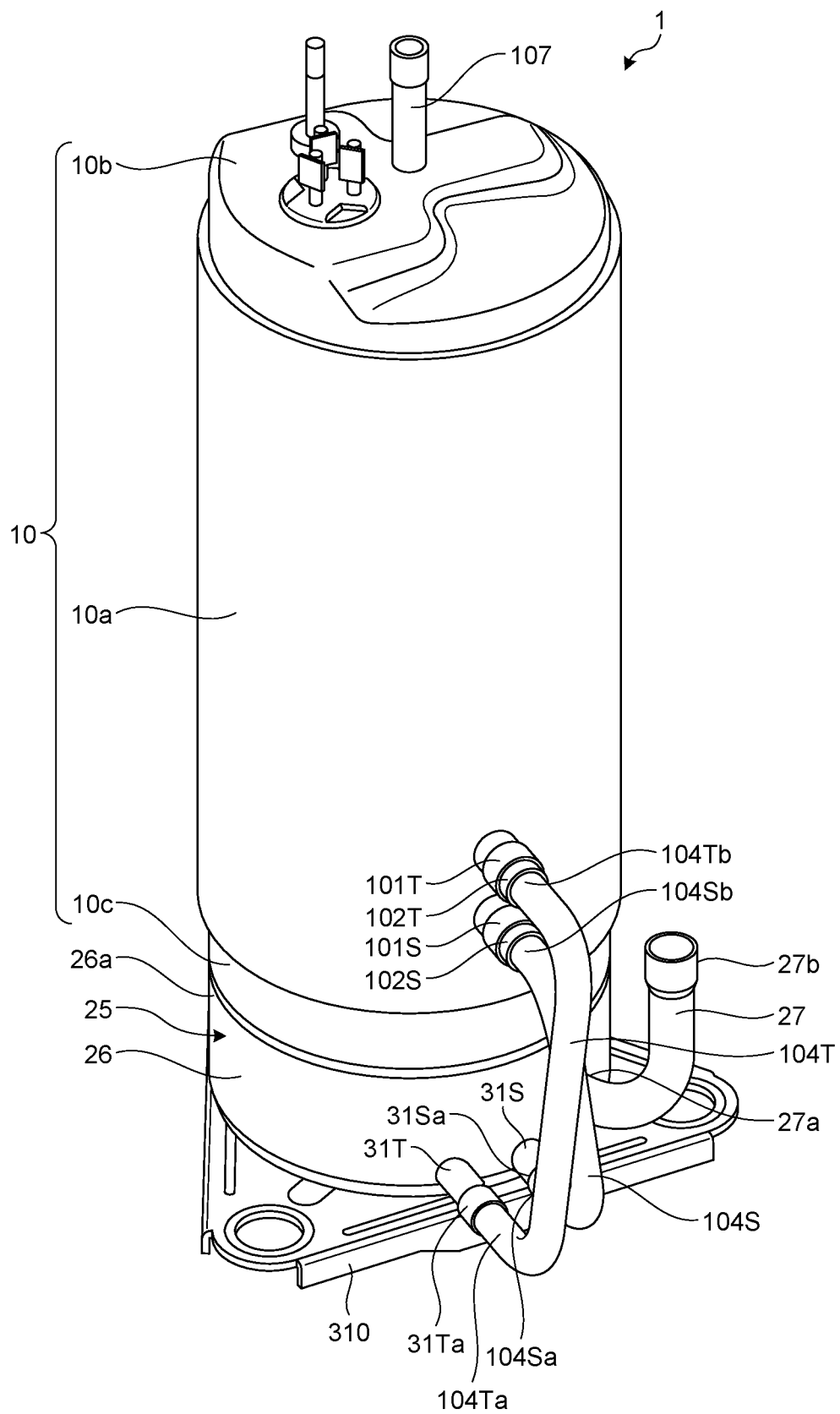
FIG. 4 is a perspective view illustrating a main part of the rotary compressor of the embodiment.

The present embodiment will describe a rotary compressor as one example of the hermetic compressor. FIG. 1 is a longitudinal sectional view illustrating the rotary compressor of the embodiment. FIG. 2 is an exploded perspective view illustrating a compression unit of the rotary compressor of the embodiment. FIG. 3 is a plan view illustrating the rotary compressor of the embodiment. FIG. 4 is a perspective view illustrating a main part of the rotary compressor of the embodiment.

As illustrated in FIG. 1, the rotary compressor 1 is an internal high-pressure type hermetic compressor in which a compression unit 12 that sucks a refrigerant from an upper compression unit suction tube 102T and a lower compression unit suction tube 102S and discharges the compressed refrigerant into a compressor body vessel 10, and a motor 11 that drives the compression unit 12, are accommodated inside the compressor body vessel 10, and the high-pressure refrigerant, which is compressed in the compression unit 12, is discharged into the compressor body vessel 10 and further discharged to a refrigeration cycle through a discharge tube 107.

The compressor body vessel 10 includes a vertically cylindrical main shell 10a, a cup-shaped top shell 10b, and a cup-shaped bottom shell 10c, as illustrated in FIGS. 1, 3, and 4. The compressor body vessel 10 is configured by fixing by welding an opening side 10g of the top shell 10b to an upper end of the main shell 10a, and fixing by welding an opening side 10d of the bottom shell to a lower end of the main shell 10a.

The upper compression unit suction tube 102T and the lower compression unit suction tube 102S for sucking the low-pressure refrigerant in the refrigeration cycle into the compression unit 12, are provided through the main shell 10a. In more detail, an upper guide tube 101T is fixed by brazing to the main shell 10a, and the upper compression unit suction tube 102T passes through the upper guide tube 101T and is fixed by brazing to the upper guide tube 101T. Similarly, a lower guide tube 101S is fixed by brazing to the main shell 10a, and the lower compression unit suction tube 102S passes through the lower guide tube 101S and is fixed by brazing to the lower guide tube 101S.

The discharge tube 107 for discharging the high-pressure refrigerant, which is compressed in the compression unit 12, from inside the compressor body vessel 10 to the refrigeration cycle, is provided through the top shell 10b. The discharge tube 107 is directly fixed by brazing to the top shell 10b.

Figure 5:
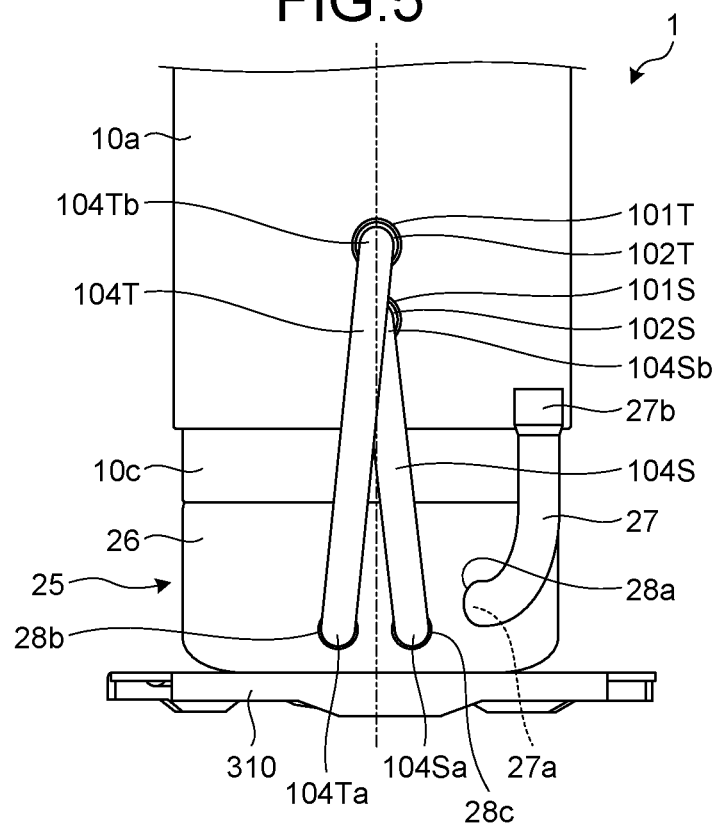
FIG. 5 is a side view illustrating the enlarged main part of the rotary compressor of the embodiment.
Figure 6:
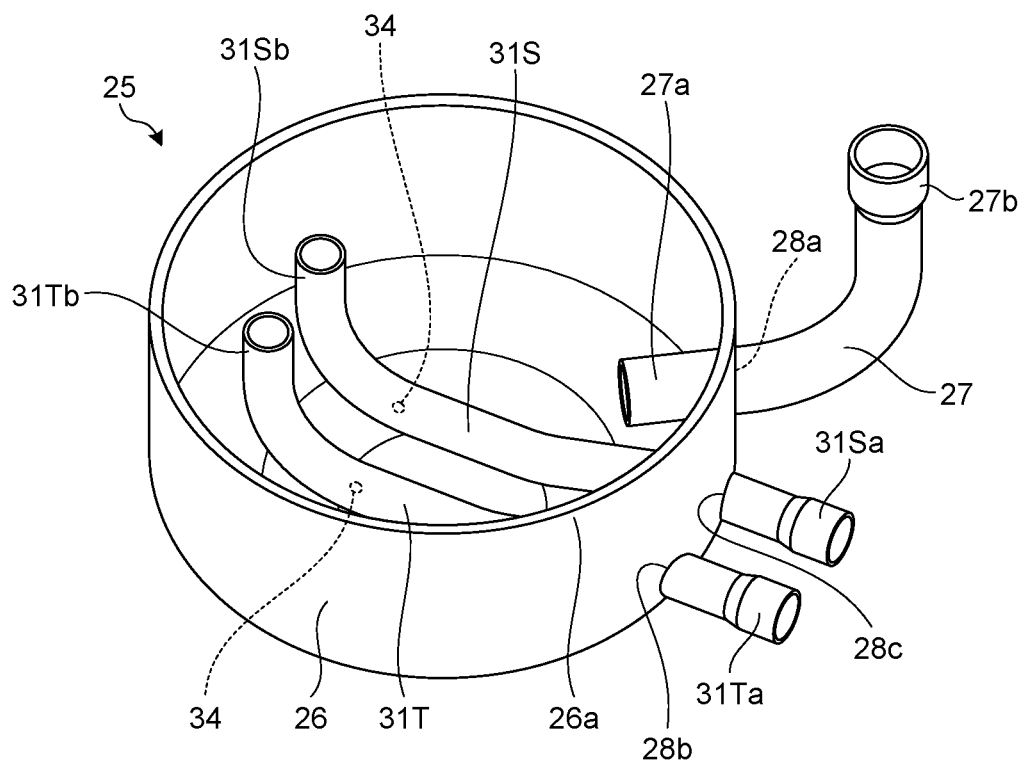
FIG. 6 is a perspective view illustrating the inside of an accumulator vessel in the embodiment.
Figure 7:
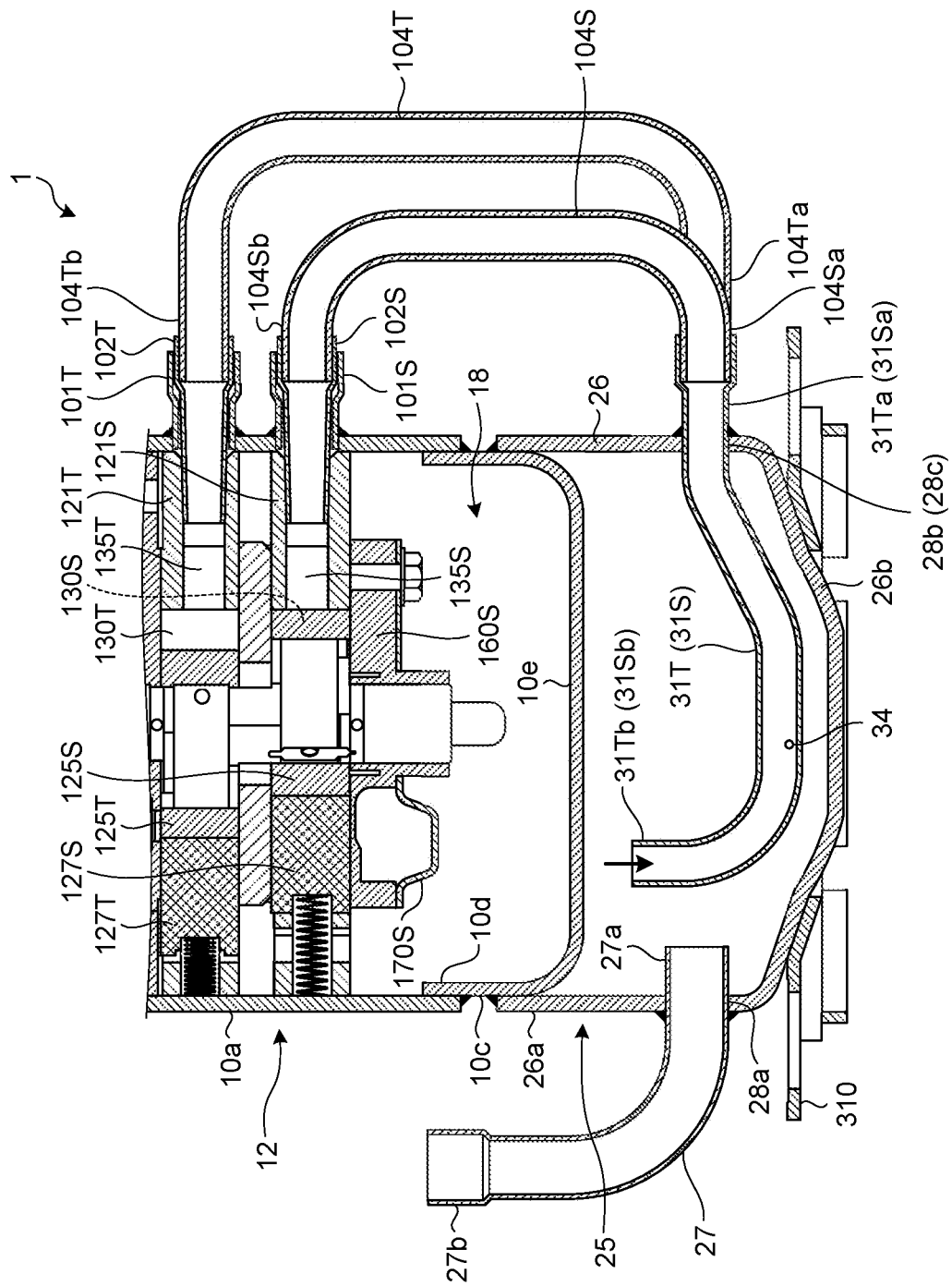
FIG. 7 is a longitudinal sectional view illustrating the main part of the rotary compressor of the embodiment.

FIG. 5 is a side view illustrating the enlarged main part of the rotary compressor 1 of the embodiment. FIG. 6 is a perspective view illustrating the inside of an accumulator vessel 25 in the embodiment. FIG. 7 is a longitudinal sectional view illustrating a main part of the rotary compressor of the embodiment. Note that for plain illustration, FIGS. 1 and 7 illustrate the position of an accumulator suction tube 27 described later shifted in the circumferential direction of an accumulator shell 26, but this does not limit the position of the accumulator suction tube 27.

As illustrated in FIGS. 4, 5, 6, and 7, the accumulator vessel 25 for separating gas-liquid of the low-pressure refrigerant, which is sucked from the refrigeration cycle, and causing only the gas refrigerant to be sucked into the compression unit 12, is provided below the compressor body vessel 10. The accumulator vessel 25 includes the cup-shaped accumulator shell 26, and an opening side 26a of the accumulator shell 26 is fixed by welding to the bottom shell 10c of the compressor body vessel 10. Therefore, the bottom shell 10c of the compressor body vessel 10 also serves as a lid for covering the opening side 26a of the accumulator shell 26.

In the accumulator shell 26, the accumulator suction tube 27, which sucks the refrigerant into the accumulator vessel 25 from the refrigeration cycle, and an upper gas-liquid separation tube 31T and a lower gas-liquid separation tube 31S, which send the gas refrigerant from inside the accumulator vessel 25, penetrate a side wall of the accumulator shell 26, and are fixed to a first through hole 28a, a second through hole 28b, and a third through hole 28c of the accumulator shell 26, respectively.

The upper gas-liquid separation tube 31T is connected to the upper compression unit suction tube 102T via an upper connecting tube 104T outside the accumulator vessel 25. The lower gas-liquid separation tube 31S is connected to the lower compression unit suction tube 102S via a lower connecting tube 104S outside the accumulator vessel 25.

As illustrated in FIG. 1, a base member 310, which supports the entire rotary compressor 1, is fixed by welding to a lower portion of the accumulator shell 26, that is, an opposite opening side 26b opposite the opening side 26a.

As illustrated in FIGS. 1 and 2, the compression unit 12 includes an upper cylinder 121T, a lower cylinder 121S, an intermediate partition plate 140, an upper end plate 160T, a lower end plate 160S, and a rotation shaft 15. The upper end plate 160T, the upper cylinder 121T, the intermediate partition plate 140, the lower cylinder 121S, and the lower end plate 160S, are stacked in this order, and are fixed by a plurality of bolts 175 and auxiliary bolts 176. The upper end plate 160T is provided with a main bearing 161T. The lower end plate 160S is provided with an auxiliary bearing 161S. The rotation shaft 15 is provided with a main shaft part 153, an upper eccentric part 152T, a lower eccentric part 152S, and an auxiliary shaft part 151. The main shaft part 153 of the rotation shaft 15 is fitted to the main bearing 161T of the upper end plate 160T, and the auxiliary shaft part 151 of the rotation shaft 15 is fitted to the auxiliary bearing 161S of the lower end plate 160S, whereby the rotation shaft 15 is rotatably supported.

The motor 11 includes a stator 111 disposed outside, and a rotor 112 disposed inside. The stator 111 is fixed to the inner circumferential surface of the main shell 10a by shrink fitting. The rotor 112 is fixed to the rotation shaft 15 by shrink fitting.

An amount of lubricant 18, in which the compression unit 12 is almost immersed, is sealed inside the compressor body vessel 10 for lubrication of a sliding member of the compression unit 12 and sealing between a high-pressure portion and low-pressure portion in the compression chamber.

Next, the compression unit 12 will be described in detail with reference to FIG. 2. A cylindrical upper hollow part 130T is provided inside the upper cylinder 121T, and an upper piston 125T is disposed in the upper hollow part 130T. The upper piston 125T is fitted to the upper eccentric part 152T of the rotation shaft 15. A cylindrical lower hollow part 130S is provided inside the lower cylinder 121S, and a lower piston 125S is disposed in the lower hollow part 130S. The lower piston 125S is fitted to the lower eccentric part 152S of the rotation shaft 15.

The upper cylinder 121T is provided with a groove, which extends from the upper hollow part 130T to the outer circumferential side, and an upper vane 127T is disposed in the groove. The upper cylinder 121T is provided with an upper spring hole 124T that leads from the outer circumference to the groove, and an upper spring 126T is disposed in the upper spring hole 124T. The lower cylinder 121S is provided with a groove, which extends from the lower hollow part 130S to the outer circumferential side, and a lower vane 127S is disposed in the groove. The lower cylinder 121S is provided with a lower spring hole 124S that leads from the outer circumference to the groove, and a lower spring 126S is disposed in the lower spring hole 124S.

Since one end of the upper vane 127T is pressed against the upper piston 125T by the upper spring 126T, the space outside the upper piston 125T is divided into an upper suction chamber 131T and an upper discharge chamber 133T in the upper hollow part 130T of the upper cylinder 121T. The upper cylinder 121T is provided with an upper suction hole 135T that communicates with the upper suction chamber 131T from the outer circumference. The upper compression unit suction tube 102T is connected to the upper suction hole 135T. Since one end of the lower vane 127S is pressed against the lower piston 125S by the lower spring 126S, the space outside the lower piston 125S is divided into a lower suction chamber 131S and a lower discharge chamber 133S in the lower hollow part 130S of the lower cylinder 121S. The lower cylinder 121S is provided with a lower suction hole 135S that communicates with the lower suction chamber 131S from the outer circumference. The lower compression unit suction tube 102S is connected to the lower suction hole 135S.

The upper end plate 160T is provided with an upper discharge hole 190T that penetrates the upper end plate 160T and communicates with the upper discharge chamber 133T. An upper discharge valve 200T that opens and closes the upper discharge hole 190T and an upper discharge valve retainer 201T that regulates warpage of the upper discharge valve 200T are fixed to the upper end plate 160T by an upper rivet 202T. An upper end plate cover 170T, which covers the upper discharge hole 190T, is disposed on the upper side of the upper end plate 160T, and forms an upper end plate cover chamber 180T that is closed with the upper end plate 160T and the upper end plate cover 170T. The upper end plate cover 170T is fixed to the upper end plate 160T with the plurality of bolts 175 that fixes the upper end plate 160T and the upper cylinder 121T. The upper end plate cover 170T is provided with an upper end plate cover discharge hole 172 that causes the upper end plate cover chamber 180T to communicate with the inside of the compressor body vessel 10.

The lower end plate 160S is provided with a lower discharge hole 190S that penetrates the lower end plate 160S and communicates with the lower discharge chamber 133S. A lower discharge valve 200S that opens and closes the lower discharge hole 190S, and a lower discharge valve retainer 201S that regulates warpage of the lower discharge valve 200S, are fixed to the lower end plate 160S by a lower rivet 202S. A lower end plate cover 170S, which covers the lower discharge hole 190S, is disposed on the lower side of the lower end plate 160S, and forms a lower end plate cover chamber 180S that is closed with the lower end plate 160S and the lower end plate cover 170S (see FIG. 1). The lower end plate cover 170S is fixed to the lower end plate 160S with the plurality of bolts 175 that fixes the lower end plate 160S and the lower cylinder 121S.

The compression unit 12 is provided with a refrigerant passage hole 136 that penetrates the lower end plate 160S, the lower cylinder 121S, the intermediate partition plate 140, the upper end plate 160T, and the upper cylinder 121T, and causes the lower end plate cover chamber 180S to communicate with the upper end plate cover chamber 180T (see FIG. 2).

The flow of refrigerant by rotation of the rotation shaft 15 will be described below. The upper piston 125T and the lower piston 125S, fitted to the upper eccentric part 152T and the lower eccentric part 152S of the rotation shaft 15, are revolved by the rotation of the rotation shaft 15, whereby the upper suction chamber 131T and the lower suction chamber 131S suck the refrigerant while expanding volumes. As a suction channel for the refrigerant, the low-pressure refrigerant of the refrigeration cycle is sucked into the accumulator vessel 25 through the accumulator suction tube 27, and when the refrigerant, sucked into the accumulator vessel 25, is mixed with liquid, the liquid will stay in a lower portion of the accumulator vessel 25, and only the gas refrigerant is sucked into the upper gas-liquid separation tube 31T and the lower gas-liquid separation tube 31S that open upward inside the accumulator vessel 25. The gas refrigerant, sucked into the upper gas-liquid separation tube 31T, is sucked into the upper suction chamber 131T through the upper connecting tube 104T and the upper compression unit suction tube 102T. Similarly, the gas refrigerant, sucked into the lower gas-liquid separation tube 31S, is sucked into the lower suction chamber 131S through the lower connecting tube 104S and the lower compression unit suction tube 102S.

If the amount of liquid refrigerant in the refrigerant, sucked from the refrigeration cycle, is large, there is a possibility that the liquid surface of the liquid refrigerant inside the accumulator vessel 25, becomes higher than openings of other ends 31Tb and 31Sb of the upper gas-liquid separation tube 31T and the lower gas-liquid separation tube 31S, and that a large amount of liquid refrigerant flows into the upper gas-liquid separation tube 31T and the lower gas-liquid separation tube 31S. If the large amount of liquid refrigerant flows into the compression unit 12 through the upper gas-liquid separation tube 31T and the lower gas-liquid separation tube 31S, this will cause damage to the compression unit 12. To prevent the large amount of liquid refrigerant from flowing into the upper gas-liquid separation tube 31T and the lower gas-liquid separation tube 31S, the upper gas-liquid separation tube 31T and the lower gas-liquid separation tube 31S are provided with liquid return holes 34 for sucking the liquid refrigerant into a gas-liquid separation tube 31 little by little.

Next, the flow of discharged refrigerant by the rotation of the rotation shaft 15, will be described. The upper piston 125T, fitted to the upper eccentric part 152T of the rotation shaft 15, is revolved by the rotation of the rotation shaft 15, whereby the upper discharge chamber 133T compresses the refrigerant while decreasing the volume. When pressure of the compressed refrigerant becomes higher than the pressure of the upper end plate cover chamber 180T outside the upper discharge valve 200T, the upper discharge valve 200T opens to discharge the refrigerant from the upper discharge chamber 133T to the upper end plate cover chamber 180T. The refrigerant, discharged to the upper end plate cover chamber 180T, is discharged from the upper end plate cover discharge holes 172, which is provided in the upper end plate cover 170T, into the compressor body vessel 10.

The lower piston 125S, fitted to the lower eccentric part 152S of the rotation shaft 15, is revolved by the rotation of the rotation shaft 15, whereby the lower discharge chamber 133S compresses the refrigerant while decreasing the volume. When pressure of the compressed refrigerant becomes higher than the pressure of the lower end plate cover chamber 180S outside the lower discharge valve 200S, the lower discharge valve 200S opens to discharge the refrigerant from the lower discharge chamber 133S to the lower end plate cover chamber 180S. The refrigerant, discharged to the lower end plate cover chamber 180S, is discharged from the upper end plate cover discharge hole 172, which is provided in the upper end plate cover 170T, into the compressor body vessel 10 through the refrigerant passage hole 136 and the upper end plate cover chamber 180T.

The refrigerant, discharged into the compressor body vessel 10, is guided above the motor 11 through a notch provided on the outer circumference of the stator 111 and providing up-and-down communication (not illustrated), a gap between windings of the stator 111 (not illustrated), or a gap 115 between the stator 111 and the rotor 112 (see FIG. 1). The refrigerant is discharged from the discharge tube 107, which is disposed above the compressor body vessel 10.

Next, the flow of the lubricant 18 will be described. The lubricant 18, sealed in the lower portion of the compressor body vessel 10, is supplied through the inside of the rotation shaft (not illustrated) to the compression unit 12 by centrifugal force of the rotation shaft. The lubricant 18, supplied to the compression unit 12, is entrained in the refrigerant and becomes misty to be discharged into the compressor body vessel 10 together with the refrigerant. The lubricant 18, which has become misty and is discharged into the compressor body vessel 10, is separated from the refrigerant by the centrifugal force due to the rotational force of the motor 11, turns into oil droplets, and returns to the lower portion of the compressor body vessel 10 again. However, part of the lubricant 18 is not separated and is discharged to the refrigeration cycle together with the refrigerant. The lubricant 18, discharged to the refrigeration cycle, circulates through the refrigeration cycle, returns to the accumulator vessel 25, is separated inside the accumulator vessel 25, and stays in the lower portion of the accumulator vessel 25. The lubricant 18, staying in the lower portion of the accumulator vessel 25, flows little by little into the upper gas-liquid separation tube 31T and the lower gas-liquid separation tube 31S along with the liquid refrigerant through the liquid return hole 34, and is sucked into the upper suction chamber 131T and the lower suction chamber 131S together with the sucked refrigerant.

(Characteristic Configuration of Rotary Compressor)

Next, the characteristic configuration of the rotary compressor 1 of the embodiment will be described. The characteristics of the embodiment include; the structure of the accumulator vessel 25 directly joined to the bottom shell 10c of the compressor body vessel 10; and the connection structure of the upper connecting tube 104T and the lower connecting tube 104S.

To begin with, in the present embodiment, the bottom shell 10c of the compressor body vessel 10 is fitted into the accumulator shell 26, and the opening side 26a of the accumulator shell 26 is joined by welding across the circumferential direction of a circumferential wall of the bottom shell 10c (see FIG. 1). The accumulator vessel 25 is sealed by the contact of an inner circumferential surface of the accumulator shell 26 and an outer circumferential surface of the bottom shell 10c of the compressor body vessel 10, and a welded portion is formed on an outer circumferential surface of the accumulator shell 26. Since the welded portion of the accumulator shell 26 and the compressor body vessel 10 faces outside of the rotary compressor 1 in this way, gas leakage from the welded portion can be easily checked. This makes it possible to easily execute work to inspect the sealing performance of the accumulator shell 26, and it is easy to secure reliability of the sealed state.

As illustrated in FIGS. 5, 6, and 7, the accumulator shell 26 is connected to the upper hollow part 130T of the upper cylinder 121T (see FIG. 2), through the upper connecting tube 104T, which is connected to the upper gas-liquid separation tube 31T, and the upper compression unit suction tube 102T. The accumulator shell 26 is connected to the lower hollow part 130S of the lower cylinder 121S (see FIG. 2), through the lower connecting tube 104S, which is connected to the lower gas-liquid separation tube 31S, and the lower compression unit suction tube 102S.

A one end 31Ta of the upper gas-liquid separation tube 31T is connected to the upper connecting tube 104T, whereas the other end 31Tb penetrates the side wall of the accumulator shell 26 and extends toward the inside of the accumulator shell 26, and is bent upward inside the accumulator shell. The one end 31Ta of the upper gas-liquid separation tube 31T penetrates the side wall of the accumulator shell 26 and is fixed by welding to the second through hole 28b of the accumulator shell 26. Similarly, a one end 31Sa of the lower gas-liquid separation tube 31S is connected to the lower connecting tube 104S, whereas the other end 31Sb penetrates the side wall of the accumulator shell 26 and extends toward the inside of the accumulator shell 26, and is bent upward inside the accumulator shell. The one end 31Sa of the lower gas-liquid separation tube 31S penetrates the side wall of the accumulator shell 26 and is fixed by welding to the third through hole 28c of the accumulator shell 26.

The one end 31Ta of the upper gas-liquid separation tube 31T and the one end 31Sa of the lower gas-liquid separation tube 31S are arranged side by side adjacent to each other in the circumferential direction on the outer circumferential surface of the accumulator shell 26. The upper gas-liquid separation tube 31T and the lower gas-liquid separation tube 31S are spaced apart and extend in parallel to each other inside the accumulator shell 26. The other end 31Tb of the upper gas-liquid separation tube 31T and the other end 31Sb of the lower gas-liquid separation tube 31S extend above the position of a one end 27a of the accumulator suction tube 27.

The one end 27a of the accumulator suction tube 27 penetrates the side wall of the accumulator shell 26 and extends into the accumulator shell 26. The one end 27a, which penetrates the side wall of the accumulator shell 26, is fixed by welding to the first through hole 28a of the accumulator shell 26. Another end 27b of the accumulator suction tube 27 extends upward of the accumulator shell 26, and is connected to low-pressure side piping (not illustrated) in the refrigeration cycle.

In the embodiment, as illustrated in FIGS. 5 and 6, in the accumulator shell 26, the first through hole 28a through which the accumulator suction tube 27 penetrates the accumulator shell 26, the second through hole 28b through which the upper gas-liquid separation tube 31T penetrates the accumulator shell 26, and the third through hole 28c through which the lower gas-liquid separation tube 31S penetrates the accumulator shell 26, are arranged adjacent to each other in the circumferential direction of the accumulator shell 26. For example, the first through hole 28a of the accumulator suction tube 27 is arranged adjacent to the third through hole 28c of the lower gas-liquid separation tube 31S in the circumferential direction of the accumulator shell 26. Note that the first through hole 28a of the accumulator suction tube 27 may be arranged adjacent to the second through hole 28b of the upper gas-liquid separation tube 31T in the circumferential direction of the accumulator shell 26.

In this way, the accumulator suction tube 27, the upper gas-liquid separation tube 31T, and the lower gas-liquid separation tube 31S are arranged together in one place in the circumferential direction of the accumulator shell 26 as illustrated in FIG. 3. This makes it possible to place the accumulator suction tube 27, the upper connecting tube 104T, and the lower connecting tube 104S together in the circumferential direction of the accumulator shell 26, forming the entire rotary compressor 1 compactly. Note that for plain illustration, FIGS. 1 and 7 illustrate the position of the accumulator suction tube 27 shifted in the circumferential direction of the accumulator shell 26, but as described above, the accumulator suction tube 27 is disposed adjacent to the lower connecting tube 104S as illustrated in FIGS. 4 and 5. Note that the accumulator suction tube 27 is disposed at a position that is not limited to the positions illustrated in FIGS. 4 and 5, but may be disposed on an opposite side of the side, on which the upper connecting tube 104T and the lower connecting tube 104S are located in the circumferential direction of the accumulator shell 26, as illustrated in FIGS. 1 and 7.

As illustrated in FIGS. 4 and 5, the upper connecting tube 104T includes a lower end 104Ta connected to the one end 31Ta of the upper gas-liquid separation tube 31T, and an upper end 104Tb connected to the upper compression unit suction tube 102T, and is disposed along the outer circumferential surface of the accumulator shell 26 and the outer circumferential surface of the compressor body vessel 10. Similarly, the lower connecting tube 104S includes a lower end 104Sa connected to the one end 31Sa of the lower gas-liquid separation tube 31S, and an upper end 104Sb connected to the lower compression unit suction tube 102S, and is disposed along the outer circumferential surface of the accumulator shell 26 and the outer circumferential surface of the compressor body vessel 10.

The second through hole 28b through which the upper gas-liquid separation tube 31T penetrates the accumulator shell 26, and the third through hole 28c through which the lower gas-liquid separation tube 31S penetrates the accumulator shell 26 are arranged side by side adjacent to each other in the circumferential direction of the accumulator shell 26, as illustrated in FIGS. 5 and 6. The upper compression unit suction tube 102T and the lower compression unit suction tube 102S are arranged side by side in the up-and-down direction of the compressor body vessel 10. The arrangement in this way allows the total length of the upper connecting tube 104T and the lower connecting tube 104S to be suppressed, and lining up of the second through hole 28b and the third through hole 28c in the circumferential direction makes it possible to constitute the upper gas-liquid separation tube 31T and the lower gas-liquid separation tube 31S with common parts.

Specifically, as illustrated in FIGS. 4 and 5, the upper end 104Tb of the upper connecting tube 104T and the upper end 104Sb of the lower connecting tube 104S are arranged in the middle between the lower end 104Ta of the upper connecting tube 104T and the lower end 104Sa of the lower connecting tube 104S in the circumferential direction of the compressor body vessel 10. Therefore, the upper connecting tube 104T extends from the radial outside of the compressor body vessel 10 to intersect with the lower connecting tube 104S with respect to the lower connecting tube 104S, which is bent in a U shape from the lower end 104Sa toward the upper end 104Sb. Accordingly, the radial length that is the length in which the upper connecting tube 104T and the lower connecting tube 104S protrude in the radial direction of the compressor body vessel 10 is kept short, making the rotary compressor 1 compact.

As illustrated in FIGS. 1 and 4, the upper end 104Tb of the upper connecting tube 104T is connected to the upper suction hole 135T of the upper cylinder 121T, via an upper guide tube 101T, which is provided on the circumferential wall of the main shell 10a of the compressor body vessel 10, and the upper compression unit suction tube 102T, which is fitted into the upper guide tube 101T. The upper end 104Sb of the lower connecting tube 104S is connected to the lower suction hole 135S of the lower cylinder 121S, via the lower guide tube 101S, which is provided on the circumferential wall of the main shell 10a of the compressor body vessel 10, and the lower compression unit suction tube 102S, which is fitted into the lower guide tube 101S.

Therefore, the one end 31Ta of the upper gas-liquid separation tube 31T is connected to the upper compression unit suction tube 102T via the upper connecting tube 104T outside the accumulator shell 26. The one end 31Sa of the lower gas-liquid separation tube 31S is connected to the lower compression unit suction tube 102S via the lower connecting tube 104S outside the accumulator shell 26. In this way, since the upper suction channel way and the lower suction channel way for sending the refrigerant from the accumulator vessel 25 to the compression unit 12, are provided independently, for example, by adjusting the length of each of the upper connecting tube 104T and the lower connecting tube 104S to a desired length, the length of the upper suction channel and the length of the lower suction channel can be easily adjusted so as to obtain the supercharging effect, described in the problem, properly. With this configuration, the present embodiment can achieve an improvement in volumetric efficiency due to the supercharging effect, and can enhance the performance of the rotary compressor 1.

Note that in the present embodiment, the upper connecting tube 104T is disposed to intersect the lower connecting tube 104S from radial outside of the compressor body vessel 10 with respect to the lower connecting tube 104S, but this does not limit the connection structure of the upper connecting tube 104T and the lower connecting tube 104S. For example, by connecting the upper end 104Tb of the upper connecting tube 104T to the lower compression unit suction tube 102S, and connecting the upper end 104Sb of the lower connecting tube 104S to the upper compression unit suction tube 102T, the lower connecting tube 104S may be disposed to intersect the upper connecting tube 104T from radially outside the compressor body vessel 10 with respect to the upper connecting tube 104T.

A filter (not illustrated) to catch a foreign substance that is contained in the refrigerant, which is supplied from the accumulator suction tube 27 to the upper gas-liquid separation tube 31T and the lower gas-liquid separation tube 31S, and support plates (not illustrated) that support the other ends 31Tb and 31Sb of the upper gas-liquid separation tube 31T and the lower gas-liquid separation tube 31S, may be provided inside the accumulator shell 26.

Effects of Embodiment

Here, the present embodiment will be described in comparison with Patent Literature 1 and 2 described above. While the compressor of Patent Literature 1 includes the compressor body vessel and the accumulator vessel as independent vessels, the rotary compressor 1 of the embodiment uses the bottom shell 10c as part of the compressor body vessel 10 and part of the accumulator vessel 25.

In the compressor of Patent Literature 2, the bottom shell of the compressor body vessel is provided with the compression unit suction tube that penetrates the bottom shell, and the refrigerant inside the accumulator vessel is directly sucked into the compression unit through the gas-liquid separation tube connected to the compression unit suction tube. While the compression unit suction tube that penetrates the bottom shell is fixed by welding to the bottom shell inside the accumulator vessel, in the rotary compressor of the embodiment, the upper gas-liquid separation tube 31T and the lower gas-liquid separation tube 31S, which send the gas refrigerant from inside the accumulator, penetrate the side wall of the accumulator shell 26, and are fixed by welding such as brazing to the second through hole 28b and the third through hole 28c of the accumulator shell 26. The upper gas-liquid separation tube 31T and the lower gas-liquid separation tube 31S are fixed by welding such as brazing to the upper connecting tube 104T and the lower connecting tube 104S outside the accumulator vessel 25, and are connected to the upper compression unit suction tube 102T and the lower compression unit suction tube 102S.

As described above, since the bottom shell 10c serves as part of the compressor body vessel 10 and part of the accumulator vessel 25, the rotary compressor 1 of the embodiment can provide a compressor with lower manufacturing cost of the rotary compressor 1 than a structure including the compressor body vessel and the accumulator vessel independently, In the rotary compressor 1 of the embodiment, the upper gas-liquid separation tube 31T and the lower gas-liquid separation tube 31S, which send the gas refrigerant from inside the accumulator vessel 25, penetrate the side wall of the accumulator shell 26, and are fixed by welding such as brazing 26 to the second through hole 28b and the third through hole 28c of the accumulator shell 26. The upper gas-liquid separation tube 31T and the lower gas-liquid separation tube 31S are fixed by welding such as brazing to the lower ends 104Ta and 104Sa of the upper connecting tube 104T and the lower connecting tube 104S, respectively, outside the accumulator vessel 25. The upper ends 104Tb and 104Sb of the upper connecting tube 104T and the lower connecting tube 104S are fixed by welding such as brazing to the upper compression unit suction tube 102T and the lower compression unit suction tube 102S, respectively. In this way, the welded portion of each of the upper gas-liquid separation tube 31T, the upper connecting tube 104T, and the upper compression unit suction tube 102T, and the welded portion of each of the lower gas-liquid separation tube 31S, the lower connecting tube 104S, and the lower compression unit suction tube 102S, are located outside the accumulator vessel 25. Therefore, welding defects can be easily detected, and the highly reliable compressor can be provided.

The upper gas-liquid separation tube 31T and the upper compression unit suction tube 102T are connected via the upper connecting tube 104T, the lower gas-liquid separation tube 31S and the lower compression unit suction tube 102S are connected via the lower connecting tube 104S, and the upper suction channel way and the lower suction channel way for sending the refrigerant from the accumulator vessel 25 to the compression unit 12, are provided independently. Therefore, by adjusting the length of each of the upper connecting tube 104T and the lower connecting tube 104S to a desired length, the length of the upper suction passage and the length of the lower suction passage can be easily adjusted so as to obtain the supercharging effect, described in the problem, properly. With this configuration, the present embodiment can achieve an improvement in volumetric efficiency due to the supercharging effect, and can provide the compressor with high performance.

In the rotary compressor 1 of the embodiment, in the accumulator shell 26, the second through hole 28b through which the upper gas-liquid separation tube 31T penetrates the accumulator shell 26, and the third through hole 28c through which the lower gas-liquid separation tube 31S penetrates the accumulator shell 26, are arranged side by side in the circumferential direction of the accumulator shell 26. The upper compression unit suction tube 102T and the lower compression unit suction tube 102S are arranged side by side in the up-and-down direction of the compressor body vessel 10. The arrangement of the upper connecting tube 104T and the lower connecting tube 104S in this way allows the total length of the upper connecting tube 104T and the lower connecting tube 104S to be suppressed, and lining up of the second through hole 28b and the third through hole 28c in the circumferential direction, makes it possible to constitute the upper gas-liquid separation tube 31T and the lower gas-liquid separation tube 31S with common parts.

In the accumulator shell 26 of the rotary compressor 1 of the embodiment, the first through hole 28a through which the accumulator suction tube 27 penetrates the accumulator shell 26, the second through hole 28b through which the upper gas-liquid separation tube 31T penetrates the accumulator shell 26, and the third through hole 28c through which the lower gas-liquid separation tube 31S penetrates the accumulator shell 26, are arranged adjacent to each other in the circumferential direction of the accumulator shell 26. This makes it possible to arrange the accumulator suction tube 27, the one end 31Ta of the upper gas-liquid separation tube 31T, the one end 31Sa of the lower gas-liquid separation tube 31S, the upper connecting tube 104T, and the lower connecting tube 104S together in the circumferential direction of the accumulator shell 26. Therefore, the entire rotary compressor 1 can be made compact.

Note that the present embodiment has been described with the rotary compressor 1 as one example, but may be applied to, for example, other compressors such as a scroll compressor, and the same effect as in the present embodiment can be obtained.

REFERENCE SIGNS LIST

1 ROTARY COMPRESSOR
10 COMPRESSOR BODY VESSEL
10a MAIN SHELL
10b TOP SHELL
10c BOTTOM SHELL
11 MOTOR
12 COMPRESSION UNIT
25 ACCUMULATOR VESSEL
26 ACCUMULATOR SHELL
26a OPENING SIDE
27 ACCUMULATOR SUCTION TUBE
28a FIRST THROUGH HOLE
28b SECOND THROUGH HOLE
28c THIRD THROUGH HOLE
31T UPPER GAS-LIQUID SEPARATION TUBE
31Ta ONE END
31Tb OTHER END
31S LOWER GAS-LIQUID SEPARATION TUBE
31Sa ONE END
31Sb OTHER END
101T UPPER GUIDE TUBE
101S LOWER GUIDE TUBE
102T UPPER COMPRESSION UNIT SUCTION TUBE
102S LOWER COMPRESSION UNIT SUCTION TUBE
104T UPPER CONNECTING TUBE
104Tb UPPER END
104Ta LOWER END
104S LOWER CONNECTING TUBE
104Sb UPPER END
104Sa LOWER END
121T UPPER CYLINDER
121S LOWER CYLINDER
135T UPPER SUCTION HOLE
135S LOWER SUCTION HOLE

The invention claimed is:

1. A hermetic compressor comprising:
a vertically cylindrical compressor body vessel in which a compression unit that sucks a refrigerant and discharges the compressed refrigerant into the compressor body vessel, and a motor that drives the compression unit, are accommodated; and
an accumulator vessel that separates gas-liquid of the refrigerant sucked from a refrigeration cycle and supplies a gas refrigerant to the compression unit, and is provided below the compressor body vessel, wherein
the compression unit includes an upper cylinder and a lower cylinder, an upper compression unit suction tube is connected to an upper suction hole of the upper cylinder, a lower compression unit suction tube is connected to a lower suction hole of the lower cylinder,
the accumulator vessel includes a cup-shaped accumulator shell, an opening side of the accumulator shell is fixed by welding to the compressor body vessel,
in the accumulator shell, an accumulator suction tube that sucks the refrigerant from the refrigeration cycle into the accumulator vessel, and an upper gas-liquid separation tube and a lower gas-liquid separation tube that send the gas refrigerant from inside the accumulator vessel penetrate a side wall of the accumulator shell, and are fixed by welding to a first through hole, a second through hole, and a third through hole of the accumulator shell respectively, the upper gas-liquid separation tube is connected to the upper compression unit suction tube via an upper connecting tube outside the accumulator shell, and the lower gas-liquid separation tube is connected to the lower compression unit suction tube via a lower connecting tube outside the accumulator shell.

2. The hermetic compressor according to claim 1, wherein
in the accumulator shell, the second through hole through which the upper gas-liquid separation tube penetrates the accumulator shell, and the third through hole through which the lower gas-liquid separation tube penetrates the accumulator shell are arranged side by side in a circumferential direction of the accumulator shell, and
the upper compression unit suction tube and the lower compression unit suction tube, are arranged side by side in an up-and-down direction of the compressor body vessel.

3. The hermetic compressor according to claim 2,
wherein in the accumulator shell, the first through hole through which the accumulator suction tube penetrates the accumulator shell, the second through hole, and the third through hole, are arranged adjacent to each other in the circumferential direction of the accumulator shell.

* * * * *